Jan. 27, 1931.  O. WERNER  1,790,184
AIRPORT FLOODLIGHT PROJECTOR
Filed June 22, 1927    4 Sheets-Sheet 1

WITNESSES:

INVENTOR
Oscar Werner.
BY
ATTORNEY

Patented Jan. 27, 1931

1,790,184

UNITED STATES PATENT OFFICE

OSCAR WERNER, OF SOUTH BEND, INDIANA, ASSIGNOR TO WESTINGHOUSE ELECTRIC & MANUFACTURING COMPANY, A CORPORATION OF PENNSYLVANIA

AIRPORT FLOODLIGHT PROJECTOR

Application filed June 22, 1927. Serial No. 200,564.

My invention relates to illuminating devices and more particularly to louvered devices adapted to control the beams of the floodlights for air landing-field illumination.

The lighting of air landing fields requires large floodlighting units of rugged construction. The projector and housing must be moisture proof for protecting the reflector and other mechanism from moisture and dust. Such a floodlight, particularly suitable for landing-field illumination, is described in my copending application, Serial No. 200,565, filed June 22, 1927.

In floodlighting fields, it has been found important to so control the light from the projector that little or no light will be projected above the horizontal plane to blind an approaching aviator. For controlling the beam, the best results have been secured by placing a louver system in the upper portion of the housing in front of the lamp. Louvers permit horizontal rays of light to pass out but they absorb the upwardly directed rays that strike the black surfaces of the louvers.

The louvers are thin metal strips so made as to afford as little interference as possible to the passage of the useful rays from the projector. Considerable difficulty has been encountered from the sagging of the thin strips of metal of which the louvers are composed particularly because of the expansion and contraction incident to heating and cooling. My device overcomes this difficulty by providing means for tightly stretching the strips so that they will not sag.

It has been found desirable to construct the louver system in a single unit to permit removing the unit for cleaning the projector and reflector and for adjusting the lamp.

Therefore, it is among the objects of my invention to provide a louver assembly for floodlights such that little or no light will be directed above the horizontal.

Another object of my invention is to provide a unitary louver assembly that may easily be removed and set aside when cleaning the projector and adjusting the lamp.

Another object of my invention is to provide means for mounting louvers such that each louver will remain tightly stretched when they are subjected to various temperatures and are expanded and contracted.

A still further object of my invention is to provide a louver assembly that is of efficient and rugged construction.

Referring to the accompanying drawings in which like numerals indicate like parts, Figure 1 is a vertical cross-sectional view of a floodlight and my louver device;

Figure 1:
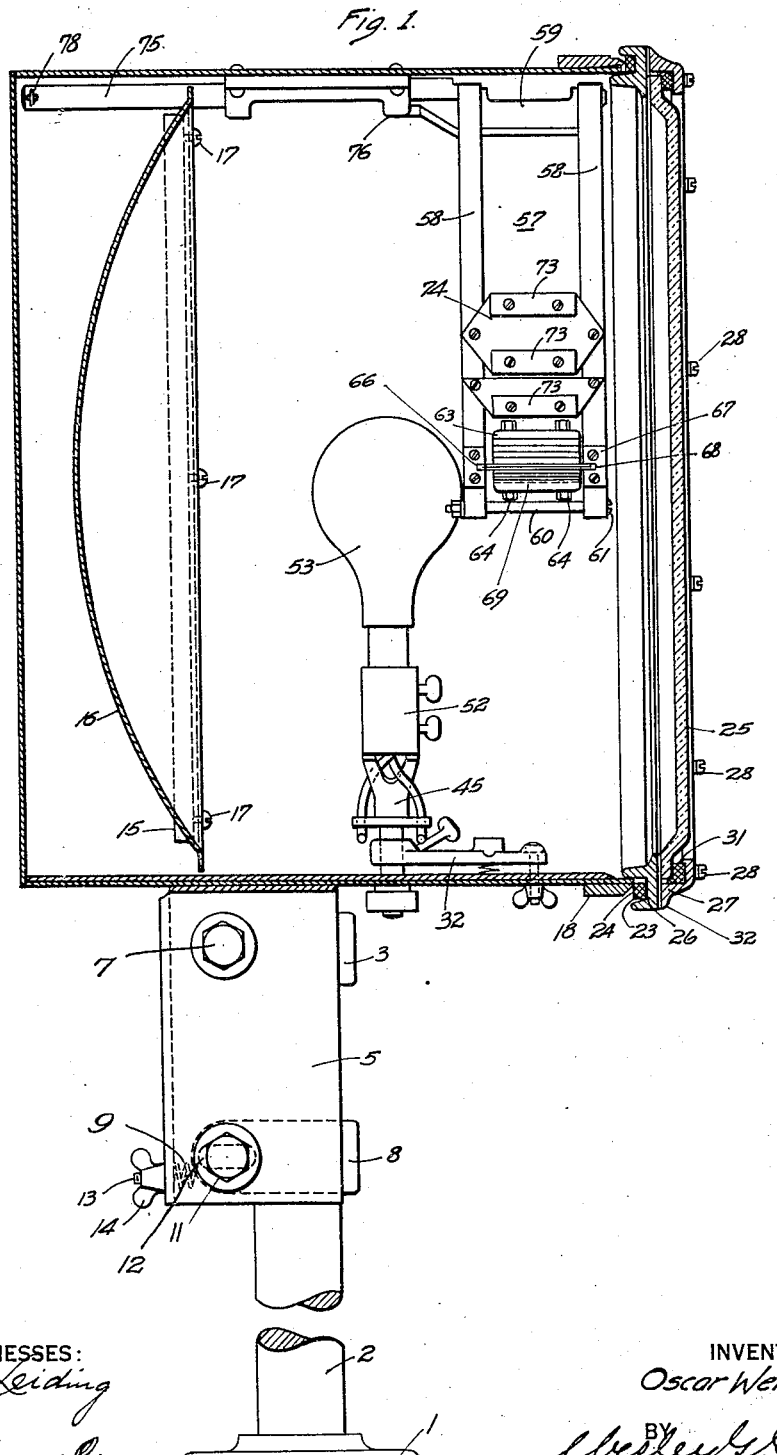
Figure 2:
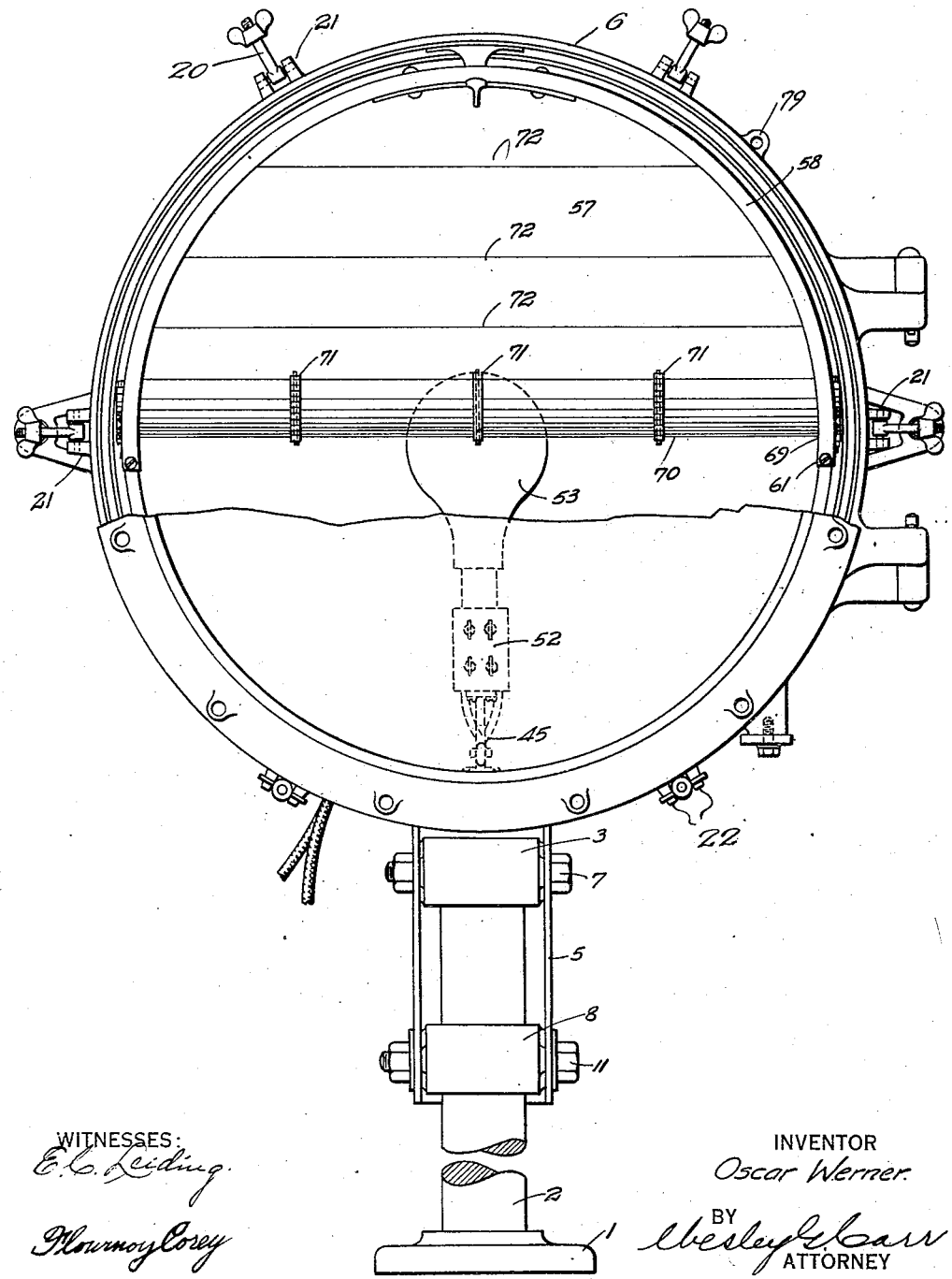
Fig. 2 is a front elevational view of the floodlight and the louver device.

Referring more particularly to the drawings, the base 1, which is secured to a fixed support (not shown), furnishes a means for mounting a standard 2 thereon. A supporting socket member 3 is fitted on the upper end of the standard 2 and a split ring member 8 on the standard 2 forms with the socket member 3 a mounting for the bracket 5 and the projector housing 6.

The socket member 3 is a split ring and may be locked on the standard 2 by means of a bolt 7. The bolt 7 also secures the bracket to the socket member. The split ring member 8 is U-shaped and may be locked to the standard in the same manner as the socket member 3 by means of another bolt 11. The lower bracket opening 12, however, is elongated so that the bracket and ring members are made movable with relation to each other. A bolt 13 is fastened to the U-shaped ring member 8. It projects through the rear wall of the bracket, and a spring 9 is disposed on bolt 13 between the ring member 8 and the rear wall of the bracket. The wing nut 14 on bolt 13 engages the rear wall of the bracket, and the bracket may be moved with relation to the housing bracket by means of the wing nut 14. By reason of this structure, the projector housing may be tilted several degrees from the horizontal. When proper adjustment of the projector housing is secured, the bolts 7 and 11 are tightened, and the housing bracket is then rigidly fastened on the standard. When the bolts 7 and 11 are loosened, the housing is free to turn and may be rotated through any part of 360 degrees to direct the beam in any direction.

The projector housing 6 is of substantially cylindrical shape, open at one end. A ring 15 on the inside of the housing supports a parabolic reflector 16 that is fastened to it by bolts 17. A ring 18 surrounds the open end of the housing and is provided with lugs 21 to support the pivots of clamping bolts 20 to engage similar lugs 22 on the door which is disposed over the opening in the housing. The door is provided with an annular recess 23, in which a rubber gasket 24 is placed, to coact with the edge of the ring 18 to provide a moisture-proof joint.

A glass cover 25 is mounted on the door 26 and is secured thereto by a rim 27 and bolts 28. A gasket 31 of felt, rubber or other resilient material is placed within the recess of the rim, thus providing a weather-proof closure between the rim and the lens.

The lamp standard 45, mounting socket 52 and lamp 53 are adjustably mounted on the focusing device 32. The focusing device provides for vertical, lateral, focal and rotational adjustment of the lamp.

A space is provided in the housing so that the louver-supporting assembly 57 may be mounted in its upper portion in front of the lamp. The louver-supporting assembly comprises two bow-members 58 of semi-annular form that are spaced apart by means of the louver-supporting bracket 59 and the two spacers 60 and the spacer bolts 61.

Figure 3:
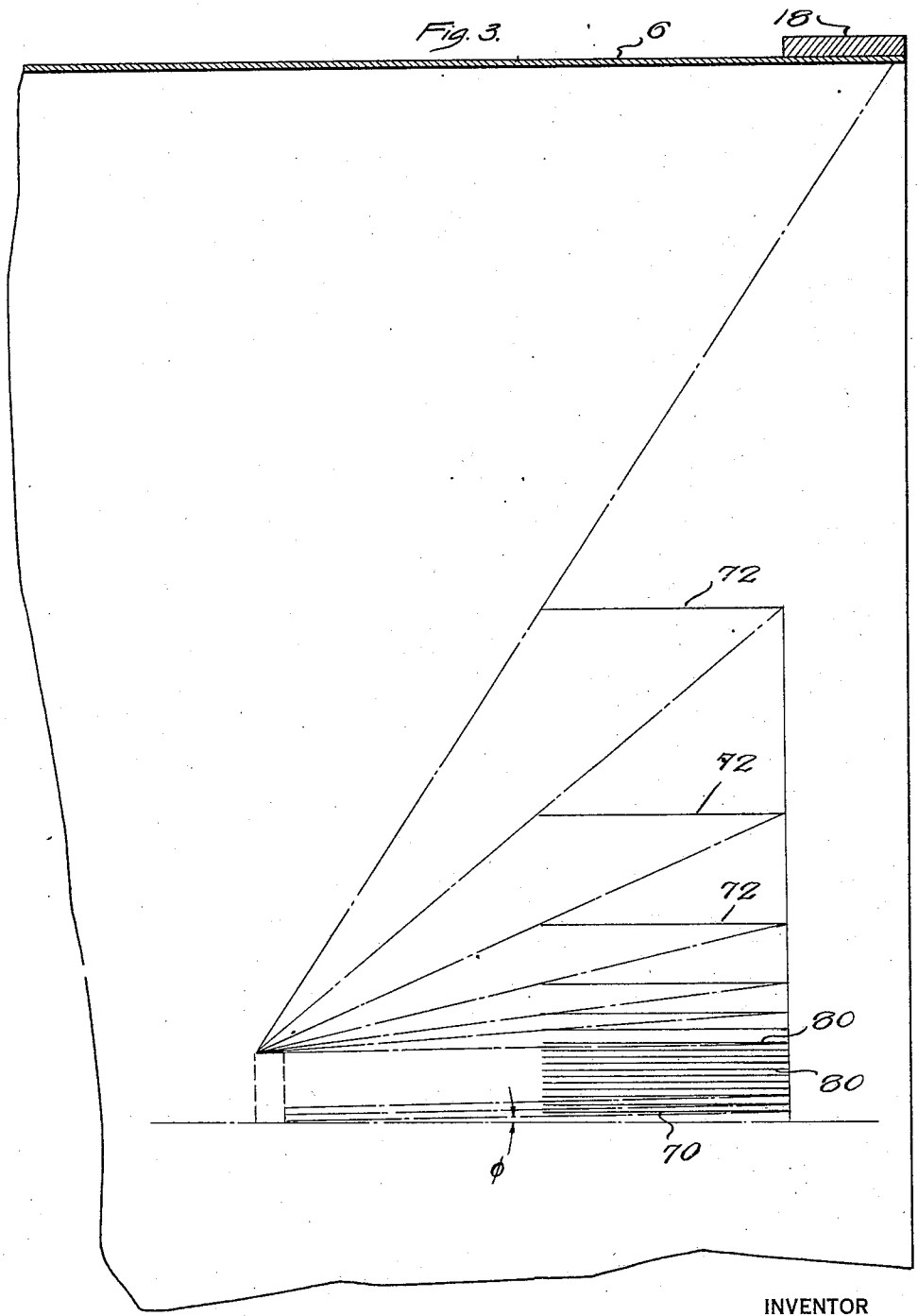
Fig. 3 is a schematic view showing the arrangement of the louvers and the disposition of the light rays with respect thereto.
Figure 4:
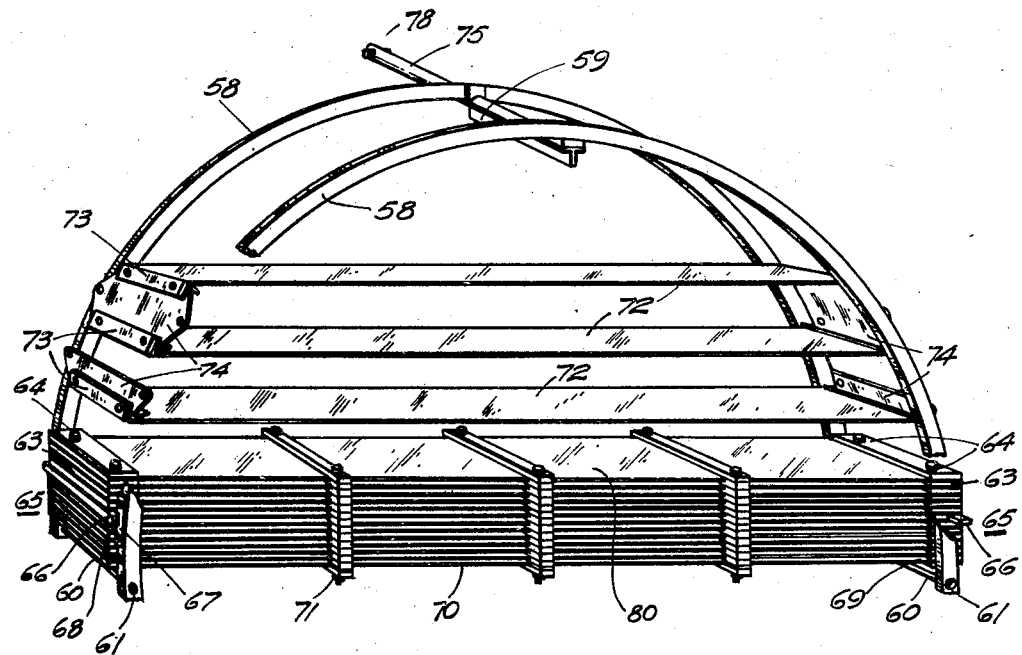
Fig. 4 is a view in perspective of my louver system.
Figure 5:
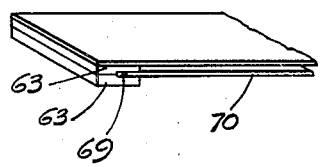
Fig. 5 is a view in perspective of the lower portion of the clamping structure utilized in my device.

I prefer to utilize a relatively large number of thin-louvers. The bottom louver is located so that the angle $\varphi$ included between a plane passed through the outer edge of the bottom louver and the light source and a horizontal plane will be not more than $1\frac{1}{2}°$ (Fig. 3). The remaining louvers 80 are spaced so that the upwardly directed beams are intercepted by the louvers. The spacers 63 at the ends of the louvers are of various thicknesses so that the space between the louvers is gradually increased from the bottom to the top of the stack. The louvers and spacers are secured by bolts 64 to form the louver-clamp assembly 65. The elongated spacers 66 at the center of the stack of louvers and spacers engage the notched guide plates 67 and in order to keep the louvers taut, they are mounted in spring bows 58. The notches 68 in the guide plate act as saddles for the spacers 66 and allow the louver-clamp assembly 65 to rock on the notches until the tension in the louvers is equally distributed. The sprung bows maintain a pressure on the center spacers at all times so that expansion and contraction of the louvers and other parts from heating and cooling is compensated for.

Grooves 69 are provided in the two lowest louver spacers so that the lowest or bottom louver 70 is allowed to slide freely longitudinally. The bottom louver is made of copper and is approximately four times as thick as the other louvers so that its inherent stiffness prevents sagging and distortion between its supports. The bottom louver is supported and the rest of the louvers are spaced by means of the washer and rod spacer assemblies 71.

The three upper louvers 72 are held at their ends by clamps 73 fastened on flexible plates 74 which, in turn are secured to the louver bows. The plates act as cantilever springs and are put under flexure when initially assembled so that the louvers are always under tension, and expansion and contraction of these louvers is also cared for.

The reason for this construction of the louver assembly becomes apparent from an analysis of the heating and the resultant air currents produced by the lamp in a projector of this type. Considerable power is used and, therefore, the heating effect is quite pronounced. The heat from the lamp maintains the louvers at a relatively high temperature, particularly the lower set which are positioned directly in front of the lamp. Because of the heat of the lamp, the air in proximity to the lamp rises, thus setting up an upward air current near the lamp and a downward air current along the comparatively cool outer surfaces of the projector. The bottom louver 70, being exposed to the circulating air currents, will be comparatively cool. Since the remaining louvers of the lower stack are not exposed to the circulating air currents, because the air between them is more or less imprisoned, these louvers will become comparatively hot. The upper louvers 72 will remain comparatively cool as compared to the louvers 71 on account of the large gap between them and consequent exposure to cooling air currents as well as their greater distance from the lamp but any expansion or contraction of the louvers 72 will be taken care of by the springs 74.

The louver frame 59 is mounted on a rod 75 which is movably secured to the upper portion of the projector housing by means of bracket 76. A stop 78 is provided at the end of the rod 75. The louver assembly hangs downward from the rod and, when the projector door is open, may be slid forward until it is outside the projector housing. It may then be rotated on the rod in a clockwise direction until it strikes the projection 79 provided on the projector housing. The bracket 76 and projection 79 form a support for the louver assembly, and the force of gravity holds it in this position until it is returned to place inside the projector.

With my construction, the louver assembly may be taken out of the projector housing and swung out of the way to facilitate cleaning of the reflector and housing and permit adjustment and replacement of the lamp. My construction provides a louver assembly in which the relative position and spacing of the louvers is not effected by expansion and contraction.

My louver system is especially designed so that very little light is projected at an angle of more than 1½ degrees above the horizontal.

Although I have described a specific modification of my device, I do not wish to be limited thereto, since such modifications as may occur to those skilled in the art may be made without departing from the spirit and scope of my invention, as defined in the appended claims.

I claim as my invention:

1. In combination with a projector housing, a louver assembly comprising a plurality of resilient bow members, spacer means for spacing apart the bows and a plurality of louvers held in tension by reason of the resiliency of said bow members, whereby said louvers are tightly stretched under varying conditions of expansion and contraction.

2. In combination with a projector housing, a louver assembly comprising a sprung supporting member, clamping means, a plurality of louvers clamped at their ends by a plurality of clamping means and means integral with said clamping means for resiliently engaging said supporting member.

3. In combination with a projector housing, a louver assembly comprising a sprung supporting member, clamping means, a plurality of louvers clamped at their ends by the said clamping means, means integral with said clamping means for resiliently engaging said supporting member, and means for resiliently connecting a second set of louvers to said supporting member.

4. In combination with a projector housing, a louver assembly comprising a sprung supporting member, clamping means, a plurality of louvers clamped at their ends by the clamping means, engaging means integral with said clamping means for resiliently engaging said supporting member, said engaging means comprising a plurality of saddles on said supporting member and projections on said clamping member for engaging said saddles.

5. In combination with a projector housing, a louver assembly comprising a sprung supporting member, clamping means, a plurality of louvers clamped at their ends by the clamping means, means integral with said clamping means for resiliently engaging said supporting member, a secondary set of louvers, resilient plates mounted on said supporting means and means on said plates for engaging said secondary louvers.

6. In combination with a projector housing, a louver assembly comprising a sprung supporting member, clamping means, a plurality of louvers clamped at their ends by the clamping means, means integral with said clamping means for resiliently engaging said supporting member, said engaging means comprising a plurality of saddles on said supporting member, projections on said clamping member for engaging said saddles, and a second set of louvers, resilient plates mounted on said supporting means and means on said plates for engaging said secondary louvers.

7. In combination with a projector housing, a louver support secured to the top of the housing, a louver rod upon which is mounted an assembly adapted to slidably engage said louver support whereby said assembly may be moved out of said housing.

8. In combination with a projector housing, a louver assembly mounted on a rod slidably engaging said housing and stopping means on said rod for stopping said louver assembly.

9. In combination with a projector housing, a louver assembly mounted on a rod slidably engaging said housing, stopping means on said rod and engaging and holding means on said housing for holding said louver assembly when it is removed from said housing.

10. In combination with a projector housing, a louver assembly comprising a sprung member and a plurality of louvers attached near their ends to said sprung member whereby said louvers are tightly stretched under varying conditions of expansion and contraction.

11. A louver structure comprising a supporting frame, a louver, and spring supporting means engaging the louver and secured to the supporting frame for holding the louver taut under varying conditions of expansion and contraction.

12. A louver structure comprising a supporting frame, a louver and a leaf-spring supporting means engaging the louver and secured to the supporting frame for holding the louver taut under varying conditions of expansion and contraction.

13. A louver system comprising a semi-annular sprung supporting member, saddles at the extremities of the semi-annular member, a plurality of louvers, a plurality of spacing members for gripping the ends of the louvers one of which spacing members is elongated for engaging the saddles of the semi-annular member whereby the louvers are held taut by reason of the resiliency of the sprung supporting member, and other secondary louvers attached to the supporting frame by means of leaf springs whereby the secondary louvers are held taut under varying conditions of expansion and contraction.

In testimony whereof, I have hereunto subscribed my name this seventh day of June, 1927.

OSCAR WERNER.